United States Patent
Chuang et al.

(10) Patent No.: US 11,546,613 B2
(45) Date of Patent: *Jan. 3, 2023

(54) METHOD AND APPARATUS FOR ADAPTIVE MOTION VECTOR PRECISION

(71) Applicant: HFI Innovation Inc., Zhubei (TW)

(72) Inventors: Tzu-Der Chuang, Zhubei (TW); Ching-Yeh Chen, Taipei (TW)

(73) Assignee: HFI Innovation Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,298

(22) Filed: Jan. 12, 2021

(65) Prior Publication Data
US 2021/0136390 A1 May 6, 2021

Related U.S. Application Data (63) Continuation of application No. 15/111,296, filed as application No. PCT/CN2015/071854 on Jan. 29, 2015, now Pat. No. 10,924,746.

(Continued)

(51) Int. Cl.
*H04N 19/176* (2014.01)
*H04N 19/105* (2014.01)
(Continued)

(52) U.S. Cl.
CPC ......... *H04N 19/176* (2014.11); *H04N 19/102* (2014.11); *H04N 19/105* (2014.11);
(Continued)

(58) Field of Classification Search
None
See application file for complete search history.

(56) References Cited

U.S. PATENT DOCUMENTS

| | | | |
|---|---|---|---|
| 8,081,682 B1 * | 12/2011 | Carbacea | H04N 19/85 375/240.24 |
| 8,149,909 B1 * | 4/2012 | Garbacea | H04N 19/176 375/240.03 |

(Continued)

FOREIGN PATENT DOCUMENTS

| | | |
|---|---|---|
| CN | 1905679 A | 1/2007 |
| CN | 102783149 A | 11/2012 |

(Continued)

OTHER PUBLICATIONS

International Preliminary Report on Patentability for International Application No. PCT/CN2015/071854 dated Aug. 11, 2016.

(Continued)

*Primary Examiner* — Stefan Gadomski
(74) *Attorney, Agent, or Firm* — Wolf, Greenfield & Sacks, P.C.

(57) ABSTRACT

A method for adaptive MV precision is disclosed. According to one embodiment, whether to use or not to use the adaptive MV precision for a current block is determined according to a prediction mode/partition type of the current block. If the adaptive MV precision is used, a current MV precision is determined for a current MV of the current block, and the current MV is encoded or decoded at the current MV precision. If the adaptive MV precision is not used, the current MV is encoded or decoded at a finer MV precision. In another embodiment, a value of a current adaptive MV precision flag is selected for a current block to indicate whether to use or not to use the adaptive MV precision for a current block according to a prediction mode/partition type of the current block.

24 Claims, 3 Drawing Sheets

Related U.S. Application Data (60) Provisional application No. 61/955,464, filed on Mar. 19, 2014, provisional application No. 61/954,171, filed on Mar. 17, 2014, provisional application No. 61/952,917, filed on Mar. 14, 2014, provisional application No. 61/932,832, filed on Jan. 29, 2014.

(51) Int. Cl.
*H04N 19/159* (2014.01)
*H04N 19/46* (2014.01)
*H04N 19/102* (2014.01)
*H04N 19/523* (2014.01)
*H04N 19/134* (2014.01)

(52) U.S. Cl.
CPC ......... *H04N 19/134* (2014.11); *H04N 19/159* (2014.11); *H04N 19/46* (2014.11); *H04N 19/523* (2014.11)

(56) References Cited

U.S. PATENT DOCUMENTS

| | | | | |
|---|---|---|---|---|
| 8,761,261 | B1* | 6/2014 | Wang | H04N 19/523 375/240.16 |
| 9,237,355 | B2* | 1/2016 | Chien | H04N 19/61 |
| 9,872,016 | B2* | 1/2018 | Chuang | H04N 19/70 |
| 10,924,746 | B2 | 2/2021 | Chuang et al. | |
| 2004/0136461 | A1* | 7/2004 | Kondo | H04N 19/30 375/240.16 |
| 2004/0218674 | A1* | 11/2004 | Kondo | H04N 19/176 375/240.16 |
| 2005/0190977 | A1* | 9/2005 | Jeon | H04N 19/132 382/239 |
| 2007/0002949 | A1* | 1/2007 | Cheung | H04N 19/523 375/240.16 |
| 2007/0140338 | A1* | 6/2007 | Bhaskaran | H04N 19/567 375/240.12 |
| 2008/0253457 | A1* | 10/2008 | Moore | H04N 19/147 375/240.16 |
| 2011/0317930 | A1* | 12/2011 | Kim | H04N 19/52 382/233 |
| 2012/0008676 | A1* | 1/2012 | Lee | H04N 19/463 375/240.02 |
| 2012/0051431 | A1* | 3/2012 | Chien | H04N 19/159 375/240.16 |
| 2012/0057631 | A1* | 3/2012 | Le Leannec | H04N 19/33 375/240.16 |
| 2012/0069906 | A1* | 3/2012 | Sato | H04N 19/523 375/240.17 |
| 2012/0093226 | A1* | 4/2012 | Chien | H04N 19/139 375/240.16 |
| 2012/0189055 | A1* | 7/2012 | Chien | H04N 19/176 375/240.14 |
| 2012/0320968 | A1 | 12/2012 | Zheng et al. | |
| 2012/0320969 | A1* | 12/2012 | Zheng | H04N 19/40 375/240.02 |
| 2012/0320981 | A1* | 12/2012 | Shimada | H04N 19/176 375/240.16 |
| 2013/0022125 | A1* | 1/2013 | Sato | H04N 19/70 375/240.16 |
| 2013/0064463 | A1* | 3/2013 | Cho | G06T 7/223 382/236 |
| 2013/0101040 | A1* | 4/2013 | Francois | H04N 19/176 375/240.16 |
| 2013/0121416 | A1* | 5/2013 | He | H04N 19/597 375/240.14 |
| 2013/0128974 | A1* | 5/2013 | Chien | H04N 19/583 375/240.15 |
| 2013/0156335 | A1* | 6/2013 | Lim | H04N 19/159 382/238 |
| 2013/0177082 | A1* | 7/2013 | Sugio | H04N 7/00 375/240.16 |
| 2013/0182760 | A1* | 7/2013 | Sasai | H04N 19/523 375/240.02 |
| 2013/0188715 | A1* | 7/2013 | Seregin | H04N 19/61 375/240.16 |
| 2013/0188720 | A1* | 7/2013 | Wang | H04N 19/147 375/240.16 |
| 2013/0272409 | A1* | 10/2013 | Seregin | H04N 19/433 375/240.16 |
| 2013/0272410 | A1* | 10/2013 | Seregin | H04N 19/176 375/240.16 |
| 2013/0301742 | A1* | 11/2013 | Cheung | H04N 19/43 375/240.29 |
| 2013/0329797 | A1* | 12/2013 | Sugio | H04N 19/52 375/240.15 |
| 2013/0335522 | A1* | 12/2013 | Zhang | H04N 19/597 348/43 |
| 2013/0336406 | A1* | 12/2013 | Zhang | H04N 19/105 375/240.16 |
| 2014/0009574 | A1* | 1/2014 | Hannuksela | H04N 19/174 348/42 |
| 2014/0023144 | A1* | 1/2014 | Park | H04N 19/117 375/240.16 |
| 2014/0044181 | A1* | 2/2014 | Siast | H04N 19/157 375/240.16 |
| 2014/0098859 | A1* | 4/2014 | Lim | H04N 19/159 375/240.12 |
| 2014/0169472 | A1* | 6/2014 | Fludkov | H04N 19/61 375/240.16 |
| 2014/0253681 | A1* | 9/2014 | Zhang | H04N 19/513 348/43 |
| 2014/0294078 | A1* | 10/2014 | Seregin | H04N 19/577 375/240.15 |
| 2015/0043635 | A1* | 2/2015 | Jung | H04N 19/52 375/240.12 |
| 2015/0163506 | A1* | 6/2015 | Chon | H04N 19/436 375/240.16 |
| 2015/0195525 | A1* | 7/2015 | Sullivan | H04N 19/521 375/240.02 |
| 2015/0195562 | A1* | 7/2015 | Li | H04N 19/53 375/240.02 |
| 2015/0271502 | A1* | 9/2015 | Hattori | H04N 19/52 375/240.02 |
| 2015/0288985 | A1* | 10/2015 | Chen | H04N 19/176 375/240.26 |
| 2015/0296222 | A1* | 10/2015 | Llin | H04N 19/52 375/240.16 |
| 2016/0337649 | A1 | 11/2016 | Chuang et al. | |
| 2017/0359587 | A1 | 12/2017 | Sullivan et al. | |

FOREIGN PATENT DOCUMENTS

| | | |
|---|---|---|
| CN | 103202016 A | 7/2013 |
| EP | 1863289 A2 | 12/2007 |
| WO | 2011/046587 A1 | 4/2011 |
| WO | 2013/053309 A1 | 4/2013 |

OTHER PUBLICATIONS

International Search Report and Written Opinion for International Application No. PCT/CN2015/071854 dated Apr. 29, 2015.

An et al., Progressive MV Resolution. Joint Collaborative Team on Video Coding (JCT-VC) of ITU-T SG16 WP3 and ISO/IEC JTC1/SC29/WG11. Jul. 2011:1-14.

Jung et al., Non-CE3: Adaptive Motion Vector Resolution based on the PU Size. Joint Collaborative Team on Video Coding (JCT-VC) of ITU-T SG16 WP3 and ISO/IEC JTC1/SC29/WG11. Nov. 2011:1-4.

Chuang et al., Non-RCE1 Simplification of RCE1 Test2. Joint Collaborative Team on Video Coding (JCT-VC) of ITU-T SG 16 WP 3 and ISO/IEC JTC 1/SC 29/WG 11, 17th Meeting: Valencia, ES, Document: JCTVC-Q0092. Apr. 4, 2014:1-5.

Li et al., Adaptive MV precision for Screen Content Coding. Joint Collaborative Team on Video Coding (JCT-VC) of ITU-T SG 16 WP 3 and ISO/IEC JTC 1/SC 29/WG 11, 16th Meeting: San Jose, US, Document: JCTVC-P0283_r1. Jan. 2014:1-3.

(56) References Cited

OTHER PUBLICATIONS

Zhou et al., Motion Vector Resolution Control for Screen Content Coding. Joint Collaborative Team on Video Coding (JCT-VC) of ITU-T SG 16 WP 3 and ISO/IEC TC 1/SC 29/WG 11, 16th Meeting: San Jose, US, Document: JCTVC-P0277. Jan. 2014:1-5.

* cited by examiner

METHOD AND APPARATUS FOR ADAPTIVE MOTION VECTOR PRECISION

CROSS REFERENCE TO RELATED APPLICATIONS

The present application is a Continuation of U.S. application Ser. No. 15/111,296, filed on Jul. 13, 2016, which is a national stage filing under 35 U.S.C. § 371 of International Patent Application Serial No. PCT/CN2015/071854, filed Jan. 29, 2015, which claims priority to U.S. Provisional Patent Application, Ser. No. 61/932,832, filed on Jan. 29, 2014, U.S. Provisional Patent Application, Ser. No. 61/952,917, filed on Mar. 14, 2014, U.S. Provisional Patent Application, Ser. No. 61/954,171, filed on Mar. 17, 2014 and U.S. Provisional Patent Application, Ser. No. 61/955,464, filed on Mar. 19, 2014. The U.S. Provisional Patent Applications are hereby incorporated by reference in their entireties.

TECHNICAL FIELD

The present invention relates to using adaptive motion vector precision for video data. In particular, the present invention relates to techniques to improve the performance of video coding by selectively enabling or disabling adaptive motion vector precision for certain types of video data. The present invention also relates to signaling method for the adaptive motion vector precision.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials. For screen contents, Intra motion compensation has been found to be useful to improve coding performance since a patch or screen contents may find similar contents in other part of the screen. In this case, an Intra motion vector is used to locate the reference screen contents in the same frame.

In HEVC, the sub-pixel motion estimation/motion compensation (ME/MC) is applied. The motion vector (MV) precision is in quarter-pixel accuracy. Furthermore, advanced motion vector prediction has been developed for HEVC, where motion candidates can be derived from spatial and temporal neighboring blocks according to motion vector competition at both the encoder and decoder sides. If a current motion vector is the same as a motion candidate, the encoder may signal the case that the current motion vector can be "merged" with the motion candidate without transmitting the motion information and the corresponding motion vector coding mode is termed as Merge mode. The motion candidate may also be used as a predictor for the current motion vector. In this case, the motion vector difference (MVD) between the current motion vector and a selected motion candidate is coded and this method is terms as advanced motion vector prediction (AMVP). For Merge mode and AMVP mode coding, the MV predictors and MV differences are also in quarter-pixel accuracy. If the MV is in sub-pixel, i.e. half-pixel or quarter-pixel, the sub-pixel motion compensation (MC) is applied. According to HEVC, the sub-pixel MC is implemented using 8-tap DCTIF (discrete cosine transform (DCT) interpolation filter) for the luma component and 4-tap DCTIF for the chroma component.

A CU-level adaptive MV precision method has been disclosed by Li, et al. in JCTVC-Q0049 ("RCE1: Adaptive MV Precision," Document of Joint Collaborative Team on Video Coding, JCTVC-Q0049, March 2014), where a CU-level flag is signaled to indicate whether all PUs in the CU use integer-precision MVs. If the flag is 1, the MV precision is in integer precision. In this case, the MV predictors for PUs are rounded to integer precision and MV differences are signaled in integer precision. If the flag is 0, the MV precision is in quarter-pixel precision. The MV coding is the same as HEVC version 1 and sub-pixel motion compensation is allowed. In HEVC Range Extensions Core Experiment 1 (RCE1) Test2, the adaptive MV precision is applied to all Inter CU. The context formation of the CU-level flag requires the information of the coded adaptive MV precision flag of the upper CU, which results in a requirement of a line buffer to store this flag.

It is desirable to develop methods for improving the coding efficiency of adaptive MV precision and/or eliminating the need for the line buffer associated with the CU-level flag for integer MV precision.

SUMMARY

A method for coding a block of video data or a motion vector (MV) of the block of video data for a video coding system utilizing adaptive MV precision is disclosed, where at least two MV precisions for the MV is used for the block of video data. According to one embodiment, whether to use or not to use the adaptive MV precision for a current block is determined according to a prediction mode of the current block, a partition type of the current block, or both. If the adaptive MV precision is used, for an encoder side, a current MV precision is determined for a current MV of the current block, and the current MV is encoded with the current MV precision. For a decoder side, a MV precision syntax element is parsed from a video bitstream or is inferred to determine a current MV precision for a current MV of the current block, and the current MV is decoded with the current MV precision. If the adaptive MV precision is not used, for an encoder side, the current MV is encoded with a finer MV precision. For a decoder side, the current MV is decoded with a finer MV precision.

For example, the adaptive MV precision can be disabled for the current block if the current block is coded using a Merge mode. Furthermore, the current block may correspond to a prediction unit (PU), the adaptive MV precision can be disabled for the current coding unit (CU) if all PUs in the current CU are coded using the Merge mode. The adaptive MV precision can be disabled for the current block if the current block corresponds to a 2N×2N prediction unit (PU). The adaptive MV precision can be disabled for the current block if the current block corresponds to a 2N×2N prediction unit (PU) coded in a Merge mode or a Skip mode. A high-level adaptive MV precision flag can be signaled at a sequence level, picture level or slice level to enable or disable the adaptive MV precision for all blocks in a corresponding sequence, picture or slice according to the high-level adaptive MV precision flag.

A current MV precision syntax element can be further signaled at the encoder side or parsed at the decoder side to identify the current MV precision if the adaptive MV precision is used for the current block. Also a current adaptive MV precision flag can be signaled at the encoder side or parsed at the decoder side to indicate whether the adaptive MV precision is used for the current block. The current MV precision syntax element, the current adaptive MV precision flag, or both can be coded by context-based coding with only one context. Alternatively, the current MV precision syntax element, the current adaptive MV precision flag, or both can be coded by context-based coding using context modeling based on information of one or more neighboring blocks, the current block, or both said one or more neighboring blocks and the current block. The information of neighboring blocks may correspond to the current MV precision of a left block, or the left block and an above block. The current adaptive MV precision flag can be signaled at a slice-level, a CU-level (coding unit level), or a PU-level (prediction unit level) for the current block if the adaptive MV precision is used for the current block and the current block corresponds to a CU or a PU. The current MV precision syntax element, the current adaptive MV precision flag, or both can be coded after all the PU syntax signaling when not all PUs in current CU are coded in merge mode. Alternatively, the MV precision syntax element, the current adaptive MV precision flag, or both can be coded after the first non-merge mode PU.

The current MV precision can be inherited from a neighboring block. For example, if the current block is coded in a merge mode, the current MV precision can be inherited from the MV precision of a target merging block. When the current MV precision corresponds to a coarser granularity such as an integer-pixel resolution or a half-pixel resolution, a MV predictor (MVP) for the current MV of the current block is rounded to the coarser granularity. When the current MV precision is associated with the MV precision of a MV difference (MVD) of the current MV and the current MV precision corresponds to a coarser granularity, the MVD is rounded to the coarser granularity and the MV precision of a MV predictor (MVP) for the current MV is unchanged.

In another embodiment, a value of a current adaptive MV precision flag for a current block is selected to indicate whether to use or not to use the adaptive MV precision for a current block according to a prediction mode of the current block, a partition type of the current block, or both. If the current adaptive MV precision flag indicates that the adaptive MV precision is used, a current MV precision is determined for a current MV of the current block, and the current MV is encoded at the current MV precision. If the current adaptive MV precision flag indicates that the adaptive MV precision is not used, the current MV is encoded at a finer MV precision.

DETAILED DESCRIPTION

In the present invention, various techniques to control the use of adaptive motion vector (MV) precision are disclosed. In particular, the adaptive MV precision is turned off for some modes or coding conditions to improve performance or to reduce complexity/storage requirement.

In screen content coding, the characteristics of screen contents are quite different from normal motion video of nature scenes. Screen contexts usually comprise sharp transitions in color, intensity or both. The fractional motion vector (MV) as adopted in various coding standards, such as the High Efficiency Video Coding (HEVC) standard may not be useful since the sub-pixel interpolation process tends to smear the sharp transitions. Therefore, it is desirable to be able to set the MV precision to integer pixel granularity adaptively depending on the characteristics of contents. A syntax element or a flag can be signaled at a slice-level, or PU-level to indicate whether the MV precision is integer pixel, half pixel, or quarter pixel.

According to one embodiment, a control flag at a higher-level syntax level such as a sequence-level flag (e.g., in sequence parameter set, SPS), picture-level (e.g., in picture parameter set, PPS) or slice-level flag (e.g., slice-header) can be signaled to turned on/off the adaptive MV precision syntax. For example, a flag in the picture level may be used to indicate whether the adaptive MV precision is turned on or off for the picture. If the adaptive MV precision is turned off for the picture, all blocks (such as coding units or prediction units) within the picture will not use the adaptive MV precision. In this case, a fixed MV precision at a finer granularity such as quarter-pixel resolution will be used. If the adaptive MV precision is turned on for the picture, the blocks within the picture may determine whether to use the adaptive MV precision individually.

The MV precision syntax/flag can be coded using context-based coding and the context modeling can depend on the information of neighboring block (e.g., neighboring CU or neighboring PU). For example, the context modeling depends on the MV precision of the left PU, the above PU or both the left and the above PU of the current block. In the method disclosed in JCTVC-Q0049, the context modelling of the MV precision syntax/flag depends on the above block, which implies the information associated with the row of above blocks has to be buffered. In one embodiment, the context modeling only depends on the MV precision of the left PU to remove the need for line buffer to store information associated with the row of above blocks. The context modeling for the MV precision can also depend on the information of current block, such as the depth of current block. The context modeling for the MV precision syntax/flag can depend on the partition type and prediction mode. For example, the context modeling for a Merge mode block can be different from other blocks. In another example, the context modeling for 2N×2N_Merge and 2N×2N_SKIP block can be different from other blocks.

In yet another embodiment, the context modeling for the MV precision only uses one context. This not only removes the need for a line buffer, but also reduces the complexity of context based coding.

The adaptive MV precision can be turned on/off or applied for certain types of blocks. For example, the adaptive MV precision can be turned on/off based on the partition type. In one example, the adaptive MV precision can be signaled when the block partition is 2N×2N. Similarly, the adaptive MV precision can be signaled when the block partition is non-2N×2N. In another example, the adaptive MV precision can be turned on/off based on the prediction mode. For example, the adaptive MV precision can be signaled when the block prediction mode is Merge mode. Similarly, the adaptive MV precision can be signaled when the block prediction mode is non-Merge mode or inter mode.

In another embodiment, the adaptive MV precision is only applied for non-2N×2N_Merge and non-2N×2N_Skip blocks. The adaptive MV precision flag can be signaled in the CU-level. Furthermore, the MV precision flag can be signaled upon determining the block to be non-2N×2N_Merge or 2N×2N_Skip block.

In another embodiment, the adaptive MV precision is only applied to non-Merge blocks. The adaptive MV precision flag can be signaled in the CU-level or PU-level. For example, if all PUs within a CU are coded in Merge mode, it implies that the adaptive MV precision is turned off and there is no need to signal the MV precision syntax/flag. The MV precision syntax/flag will be signaled only if there is at least one non-Merge PU in the CU. The MV precision syntax/flag can be coded after all the PU syntax signaling when not all PUs in current CU are coded in merge mode. Alternatively, the MV precision syntax/flag can be coded after the first non-merge mode PU.

In yet another embodiment, the adaptive MV precision flag can be set to certain value, such as True or False, for certain types of blocks. For example, the adaptive MV precision flag can be set to True or False based on the partition type and/or prediction mode. In one example, the adaptive MV precision flag is set to True or False when the block partition is 2N×2N. Similarly, the adaptive MV precision flag can be set to True or False when the block partition is non-2N×2N. In another example, the adaptive MV precision flag can be set to True or False when the block prediction mode is Merge mode. Similarly, the adaptive MV precision flag can be set to True or False when the block prediction mode is non-Merge mode or inter mode. In yet another example, the adaptive MV precision flag can be set to True or False for non-2N×2N_Merge and non-2N×2N_Skip blocks.

The MV precision for a current block can inherit the MV precision of a neighboring block. For example, if the prediction mode of the current block is Merge mode, the MV precision of the current block can inherit the MV precision of the target merging block. For example, if the current block is merged with the left block, the MV precision of the current block can inherit the MV precision of the left block.

When the MV precision is set to a coarser granularity, the motion vector predictor (MVP) can be rounded to the target granularity. For example, if the MV precision is integer pixel, the MVP at the quarter pixel precision will be rounded to the integer precision. The rounding process can round the value of a MV to a nearest integer. However, when there are two nearest integers at an equal distance to the MVP, the MVP will be rounded to the integer closer to zero. For example, 0.5 is rounded to 0, and −1.5 is rounded to −1. The rounding can also always be rounded to the nearest integer closer to zero. For example, 0.75 is rounded to zero instead of 1.

When the MV precision is set to a coarser granularity, the motion vector difference (MVD) coding syntax can also be changed. For example, if the MV precision is set to integer, the first two bins of MVD codeword corresponding to the abs_mvd_greater0 flag and abs_mvd_greater1 flag can be skipped, where the abs_mvd_greater0 flag specifies whether the absolute value of a motion vector component difference is greater than 0 and the abs_mvd_greater1 flag specifies whether the absolute value of a motion vector component difference is greater than 1.

When the MV precision is set to a coarser granularity, the context modeling of the MVD coding syntax can be also changed. For example, the context models for syntax elements, abs_mvd_greater0 flag and abs_mvd_greater1 flag of different MV precision can use different sets of context models.

In another embodiment, the MV precision syntax/flag is associated with the MVD. When the MV precision for MVD is set to a coarser granularity, the MVD precision can be set to integer and however, the MVP precision is unchanged. In other words, no rounding is applied to MVP.

In another embodiment, the MV precision syntax/flag is associated with the MVP. When the MV precision for MVD is set to a coarser granularity, the MVP precision can be set to integer and however, the MVD precision is unchanged. In other words, the MVD precision is in a finer precision.

For a Merge block or 2N×2N Merge/Skip block, the MV information can be inherited from a spatial neighboring block or temporal collocated block without rounding to an integer pixel precision. However, the MVs may be rounded during the motion compensation (MC) process of this Merge block. In other words, the un-rounded MVs are stored and used as predictors for neighboring blocks, and the rounded MVs are used for MC of this Merge block.

The adaptive MV precision flag can be signaled after all the PU syntax signaling. The adaptive MV precision flag will be transmitted only when the current CU is not coded in certain modes, such as 2N×2N Skip/Merge mode, or all PUs in the current CU being Merge mode. Otherwise, the adaptive MV precision flag is inferred as False. Alternatively, the adaptive MV precision flag will be transmitted after the first non-merge mode PU.

Figure 1:
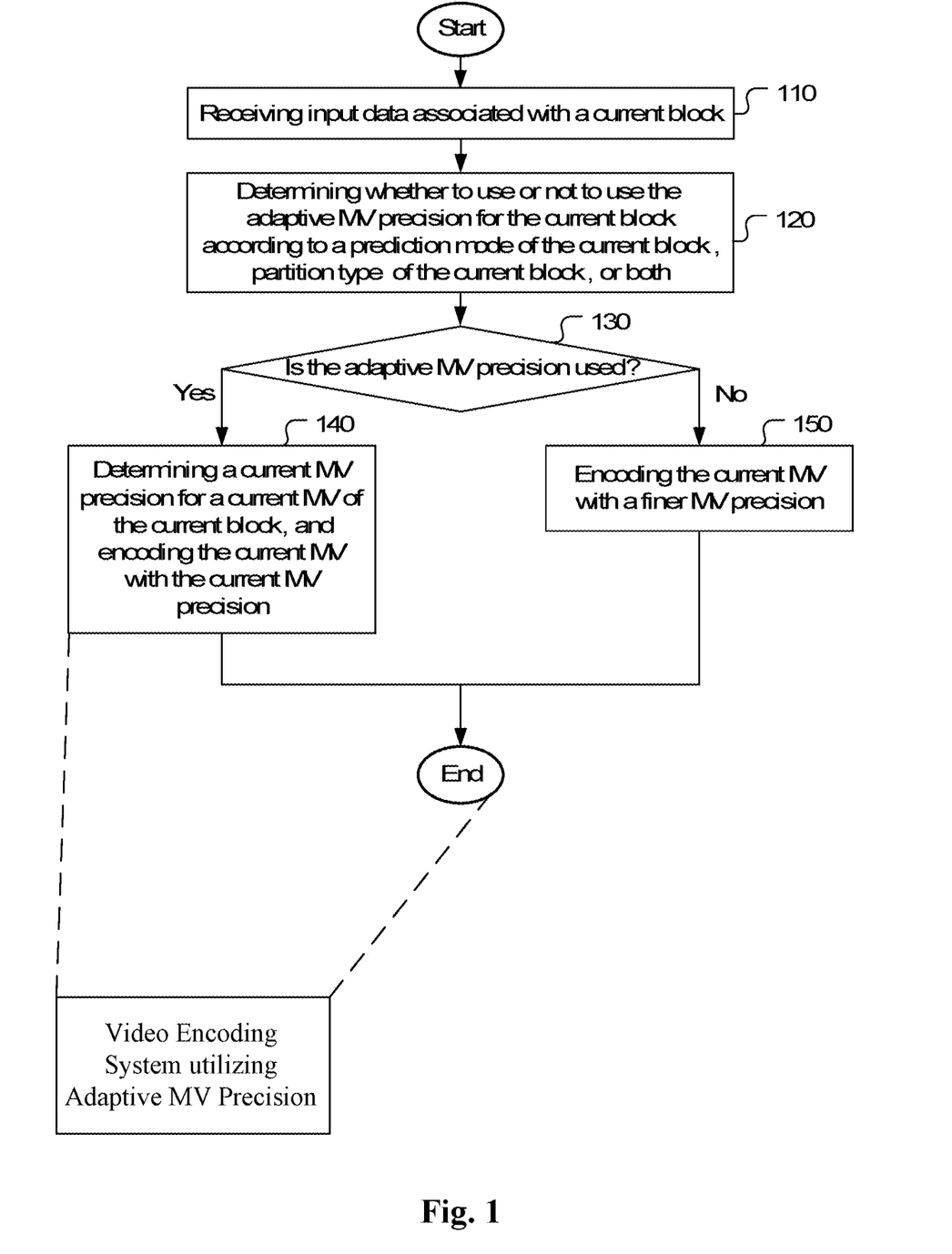
FIG. 1 illustrates an exemplary flowchart for video encoding using adaptive motion vector precision according to an embodiment of the present invention.

FIG. 1 illustrates an exemplary flowchart for video encoding using adaptive motion vector precision according to an embodiment of the present invention. The flowchart in FIG. 1 corresponds to encoding process of a block of video data or a motion vector (MV) of the block of video data for a video encoding system utilizing adaptive MV precision. The system allows using at least two MV precisions for encoding the MV or encoding the block of video data. The video data includes screen contents. When used for encoding the block of video data, the MV is used to access reference data and information related to the MV is also encoded. The system receives input data associated with a current block as shown in step 110. The input data may include information related to the current block such as the motion vector, prediction mode, partition type, etc. The information may be derived by other processing units of the encoder system and the input data may be retrieved from memory (e.g., computer memory, buffer (RAM or DRAM) or other media) or from a processor. Whether to use or not to use the adaptive MV precision for the current block is determined according to a prediction mode of the current block, a partition type of the current block, or both as shown in step 120. A test regarding whether the adaptive MV precision used is performed in step 130. If the result is "Yes", step 140 is performed. If the result is "No", step 150 is performed. In step 140, a current MV precision is determined for a current MV of the current block, and the current MV is encoded at the current MV precision. In step 150, the current MV is encoded at a finer MV precision.

Figure 2:
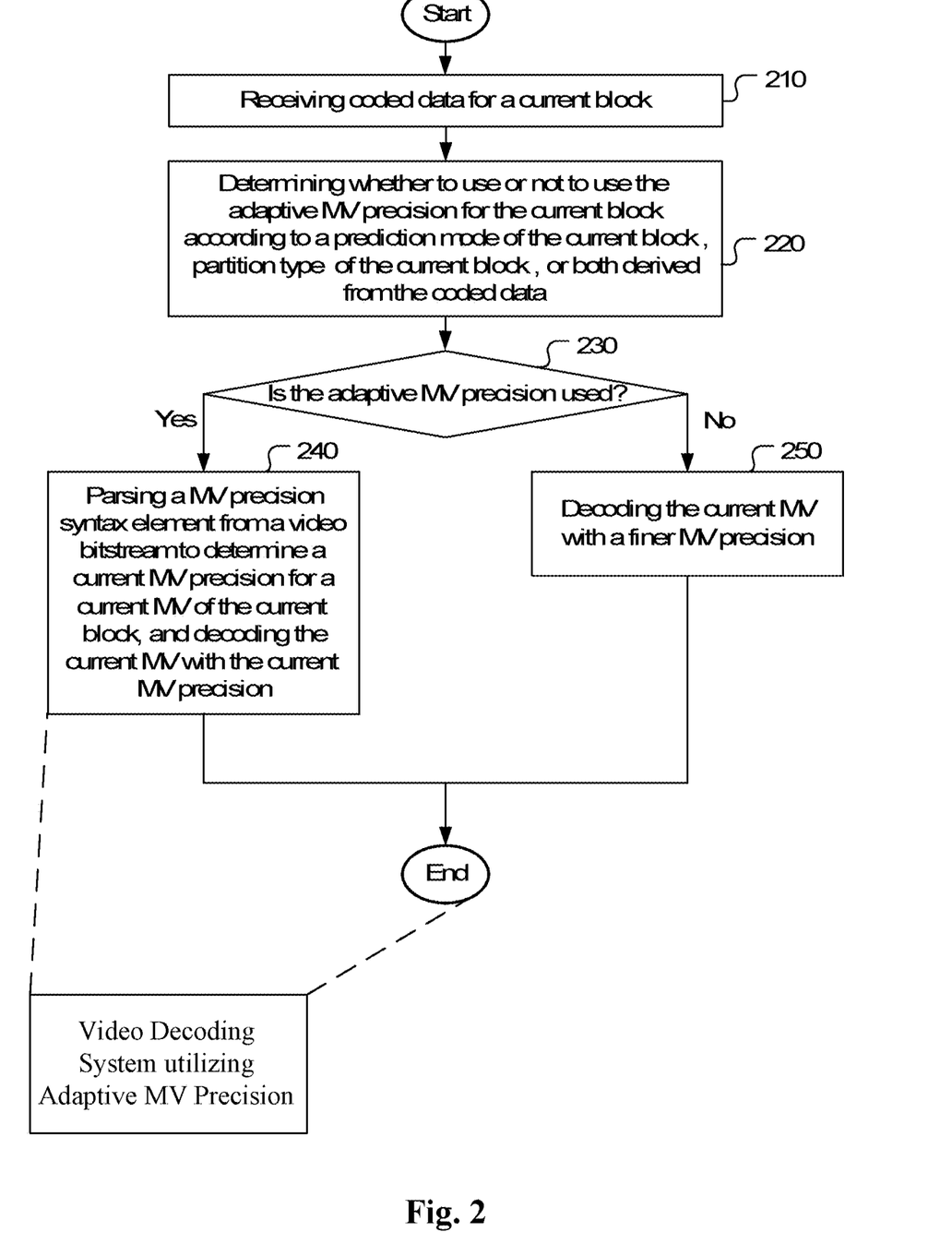
FIG. 2 illustrates an exemplary flowchart for video decoding using adaptive motion vector precision according to an embodiment of the present invention.

FIG. 2 illustrates an exemplary flowchart for video decoding corresponding to the encoding system of FIG. 1 using adaptive motion vector precision according to an embodiment of the present invention. Coded data for a current block is received in step 210. Whether to use or not to use the adaptive MV precision for a current block is determined in step 220 according to a prediction mode of the current block, a partition type of the current block, or both derived from the coded data. A test regarding whether the adaptive MV precision used is performed in step 230. If the result is "Yes", step 240 is performed. If the result is "No", step 250 is performed. In step 240, a MV precision syntax element is parsed from a video bitstream to determine a current MV precision for a current MV of the current block, and the current MV is decoded at the current MV precision. In step 250, the current MV is decoded at a finer MV precision.

Figure 3:
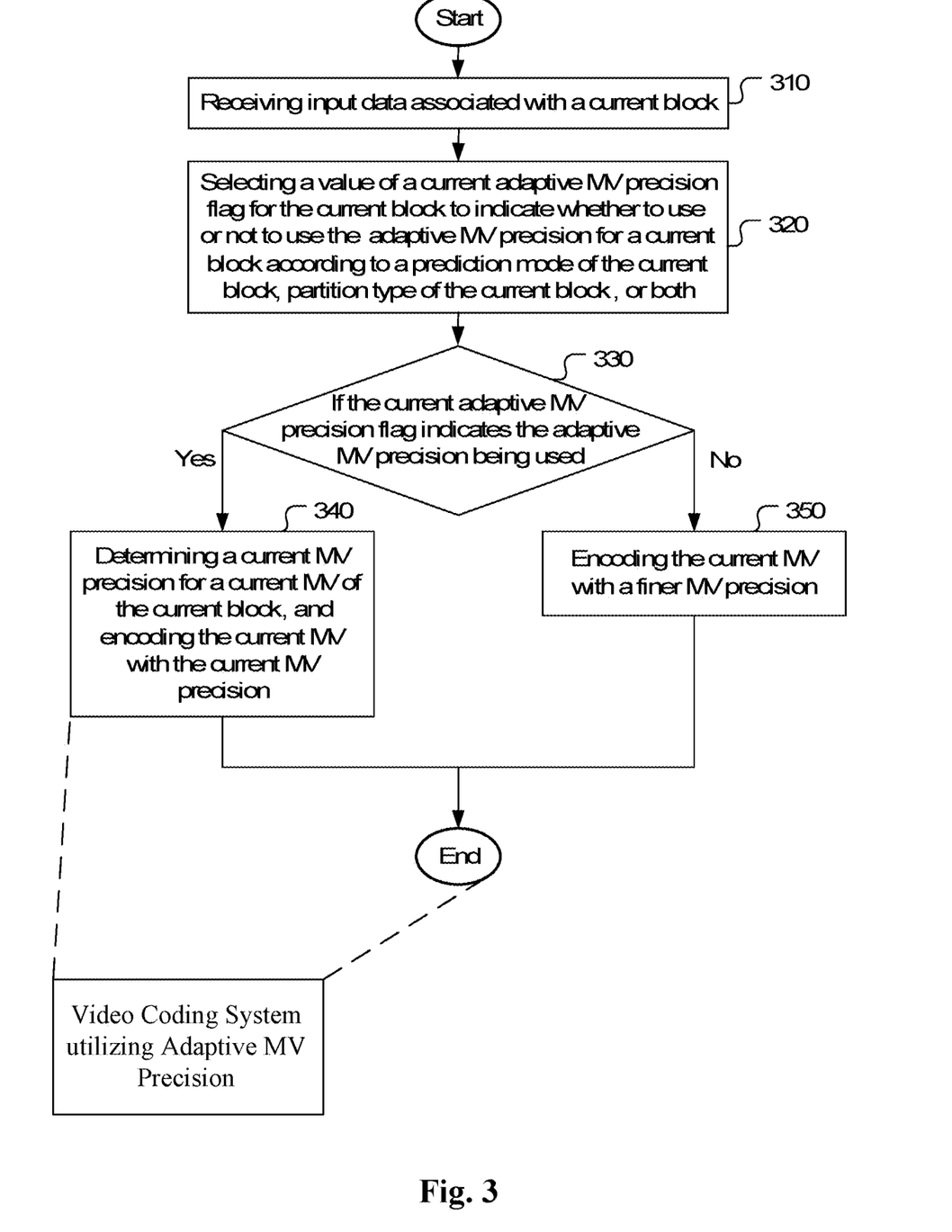
FIG. 3 illustrates another exemplary flowchart for video encoding using adaptive motion vector precision according to an embodiment of the present invention.

FIG. 3 illustrates another exemplary flowchart for video encoding using adaptive motion vector precision according to an embodiment of the present invention. The system receives input data associated with a current block as shown in step 310. The input data may include information related to the current block such as the motion vector, prediction mode, partition type, etc. The information may be derived by other processing units of the encoder system and the input data may be retrieved from memory (e.g., computer memory, buffer (RAM or DRAM) or other media) or from a processor. A value of a current adaptive MV precision flag is selected for a current block to indicate whether to use or not to use the adaptive MV precision for a current block according to a prediction mode of the current block, a partition type of the current block, or both in step 320. A test regarding whether the current adaptive MV precision flag indicates that the adaptive MV precision is used is performed in step 330. If the result is "Yes", step 340 is performed. If the result is "No", step 350 is performed. In step 340, a current MV precision is determined for a current MV of the current block, and the current MV is encoded at the current MV precision. In step 350, the current MV is encoded at a finer MV precision.

The flowcharts shown are intended to illustrate examples of video coding using adaptive MV precision according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of encoding a motion vector (MV) of a block of video data for a video coding system utilizing adaptive MV precision, the method comprising:

receiving input data associated with a first current block of video data;

determining a partition type of the first current block of video data;

determining whether a condition of disabling a selection of pixel granularity for MV precision is satisfied or not based on determining (a) whether the partition type of the first current block is a non-partitioned mode, a partitioned mode, or both, and (b) if a prediction mode of the first current block of video data is coded using a Merge mode; and responsive to determining that the condition is not satisfied:

determining a current MV precision for a first current MV of the first current block of video data from a plurality of MV precisions, wherein each MV precision of the plurality of MV precisions is associated with a different pixel granularity;

signaling an adaptive MV precision syntax element indicating the current MV precision; and encoding the first current MV of the first current block of video data at the current MV precision.

2. A method of decoding a motion vector (MV) of a block of video data for a video decoding system utilizing adaptive MV precision, the method comprising:
receiving coded data for a first current block of video data;
determining a partition type of the first current block of video data from the coded data;
determining whether a condition of disabling a selection of pixel granularity for MV precision is satisfied or not based on determining (a) whether the partition type of the first current block of video data is a non-partitioned mode, a partitioned mode, or both, and (b) if a prediction mode of the first current block of video data is coded using a Merge mode; and
responsive to determining that the condition is not satisfied:
selecting one of a plurality of MV precisions as a current MV precision for a first current MV of the first current block of video data by parsing an adaptive MV precision syntax element from the coded data or inferring the adaptive MV precision syntax element, wherein each MV precision of the plurality of MV precisions is associated with a different pixel granularity; and
decoding the first current MV of the first current block of video data at the current MV precision.

3. The method of claim 2, further comprising:
receiving coded data for a second current block of video data, wherein the second current block corresponds to a coding unit (CU) and the CU is divided into multiple prediction units (PUs);
identifying a prediction mode of the second current block of video data, a partition type of the second current block of video data, or both, from the coded data;
determining whether the condition of disabling the selection of MV precision is satisfied or not based on whether the prediction mode of the second current block of video data is equal to a specific prediction mode and/or the partition type of the second current block of video data is equal to a specific partition, wherein the condition is determined to be satisfied if all PUs in the CU are coded using the Merge mode; and
responsive to determining that the condition is satisfied:
decoding a second current MV of the second current block of video data at a fixed and predetermined MV precision.

4. The method of claim 2, wherein the condition is determined to be satisfied if the partitioned mode of the first current block of video data is a 2N×2N partition.

5. The method of claim 2, wherein the condition is determined to be satisfied if the partitioned mode of the first current block of video data is a 2N×2N partition and the prediction mode of a second current block is the Merge mode or a Skip mode.

6. The method of claim 2, wherein a high-level adaptive MV precision flag is signaled at a sequence level, picture level or slice level to enable or disable the determination of whether the condition of disabling the selection of MV precision is satisfied or not.

7. The method of claim 2, wherein the adaptive MV precision syntax element is coded by context-based coding with only one context.

8. The method of claim 2, wherein the adaptive MV precision syntax element is coded after signaling all prediction unit (PU) syntax when not all PUs in a current coding unit (CU) corresponding to the first current block of video data are coded in Merge mode.

9. The method of claim 2, wherein the adaptive MV precision syntax element is coded after a first non-Merge mode PU within the first current block of video data.

10. The method of claim 2, wherein the adaptive MV precision syntax element is coded by context-based coding using context modeling based on information of one or more neighboring blocks, the first current block of video data, or both said one or more neighboring blocks and the first current block of video data.

11. The method of claim 10, wherein the information of said one or more neighboring blocks corresponds to an MV precision of a left block, or the left block and an above block.

12. The method of claim 2, wherein the adaptive MV precision syntax element is coded by context-based coding using context modeling based on the prediction mode of the first current block of video data, the partition type of the first current block of video data, or both.

13. The method of claim 2, wherein the adaptive MV precision syntax element is signaled at a slice-level, a CU-level (coding unit level), or a PU-level (prediction unit level) for the first current block of video data if the condition is determined to not be satisfied for the first current block of video data and the first current block of video data corresponds to a CU or a PU.

14. The method of claim 2, further comprising:
rounding a MV difference (MVD) of the first current MV to the current MV precision.

15. The method of claim 2, further comprising rounding a MV predictor (MVP) for the first current MV of the first current block of video data to the current MV precision, comprising:
rounding the MVP to a target value, wherein the target value is a value nearest to the MVP and fit to the current MV precision.

16. The method of claim 15, wherein if there are two nearest values at an equal distance to the MVP, the target value is one of the two nearest values which is closer to zero.

17. A method of decoding a motion vector (MV) of a block of video data for a video decoding system utilizing adaptive MV precision, the method comprising:
receiving coded data for a current block of video data; and
determining whether a condition of disabling a selection of MV precision is satisfied based on (a) a high-level adaptive MV precision flag that is signaled at a sequence level, picture level or slice level, and (b) whether the current block of video data is coded using merge mode,
wherein responsive to determining that the condition is not satisfied:
selecting one of a plurality of MV precisions, the plurality of MV precisions comprising a pixel MV precision and at least one sub-pixel MV precision, as a current MV precision for a current MV of the current block of video data by parsing an adaptive MV precision syntax element from the coded data or inferring the adaptive MV precision syntax element; and
decoding the current MV of the current block of video data at the current MV precision by:
rounding a MV predictor (MVP) for the current MV of the current block to the current MV precision; and
decoding the current MV based on the rounded MVP; and wherein responsive to determining that the condition is satisfied:

decoding the current MV of the current block of video data at a fixed and predetermined MV precision selected from the plurality of MV precisions.

18. The method of claim 17, wherein the adaptive MV precision syntax element is coded by context-based coding with only one context.

19. The method of claim 17, wherein the adaptive MV precision syntax element is coded by context-based coding using context modeling based on information of one or more neighboring blocks, the current block of video data, or both of said one or more neighboring blocks and the current block of video data.

20. The method of claim 19, wherein the information of said one or more neighboring blocks corresponds to an MV precision of a left block, or the left block and an above block.

21. The method of claim 17, wherein the adaptive MV precision syntax element is coded by context-based coding using context modeling based on a prediction mode of the current block of video data, a partition type of the first current block of video data, or both.

22. The method of claim 17, wherein the adaptive MV precision syntax element is signaled at a slice-level, a CU-level (coding unit level), or a PU-level (prediction unit level) for the current block of video data if the condition is determined to not be satisfied for the first current block of video data and the first current block of video data corresponds to a CU or a PU.

23. The method of claim 17, wherein rounding the MVP for the current MV of the current block of video data to the current MV precision comprises:

rounding the MVP to a target value, wherein the target value is a value nearest to the MVP and fit to the current MV precision.

24. The method of claim 23, wherein if there are two nearest values at an equal distance to the MVP, the target value is one of the two nearest values which is closer to zero.

\* \* \* \* \*